March 3, 1942.　　M. A. WECKERLY　　2,275,331
HOPPER
Filed April 25, 1938　　3 Sheets-Sheet 1
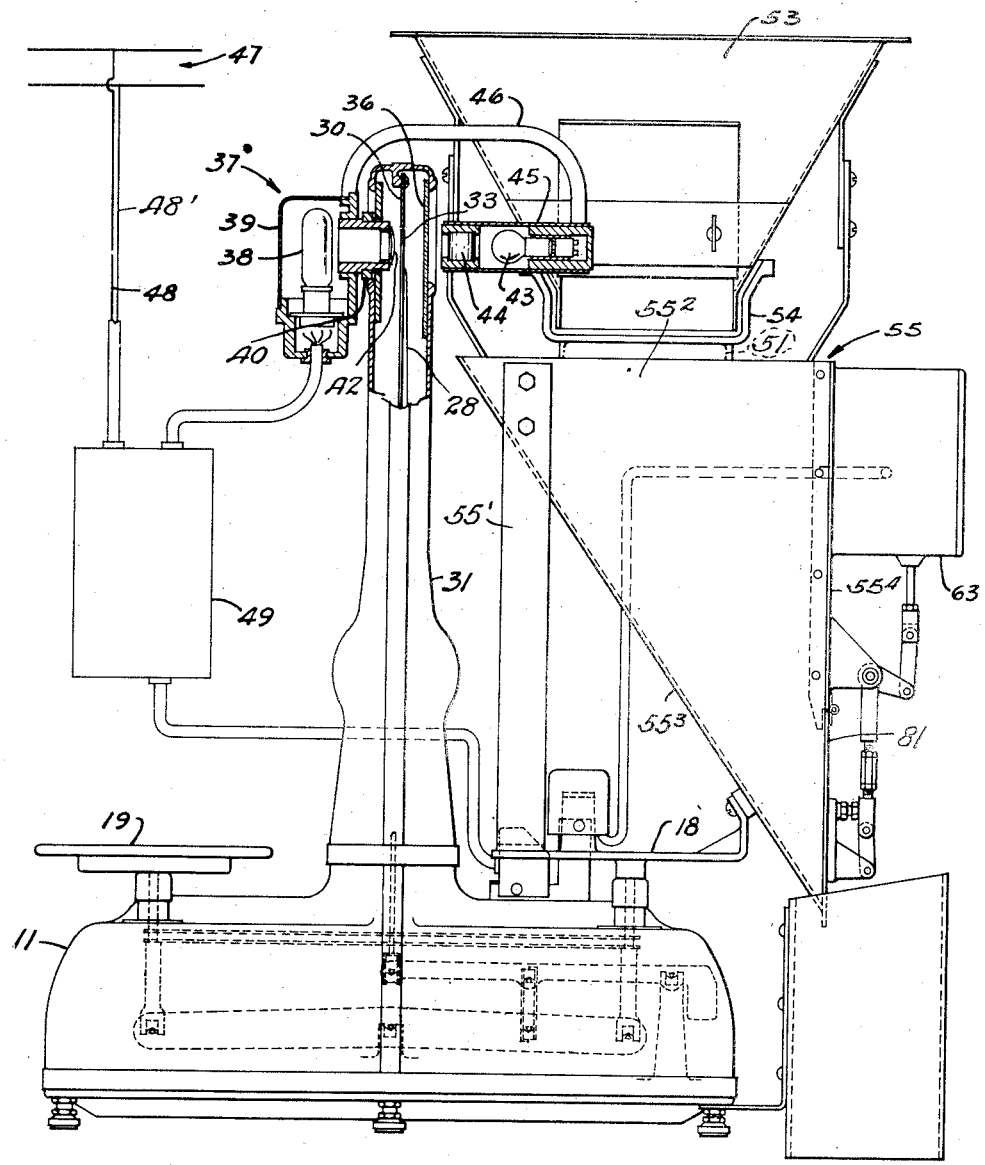
Fig. I
Mark A. Weckerly
INVENTOR
By Marshall & Marshall
ATTORNEYS

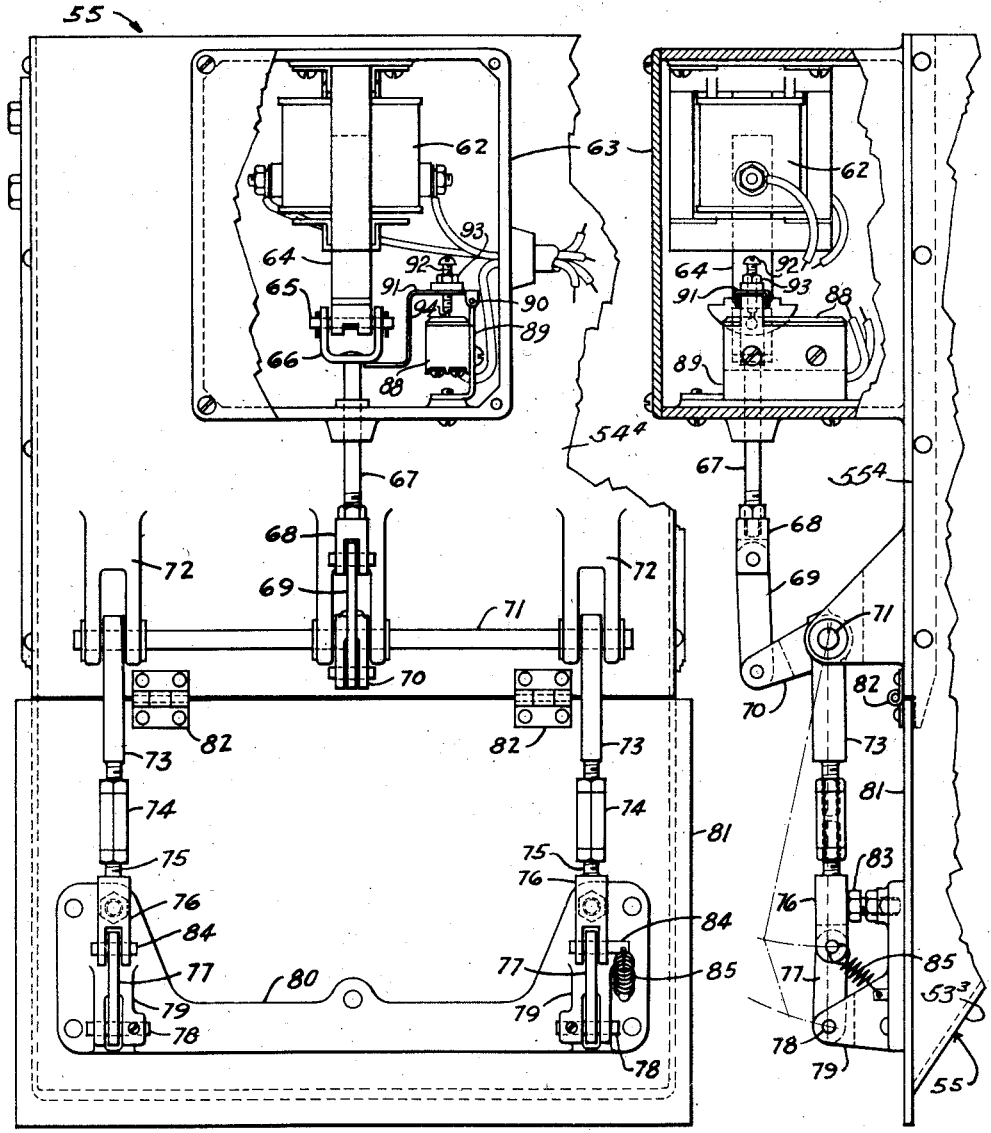

March 3, 1942. M. A. WECKERLY 2,275,331
HOPPER
Filed April 25, 1938 3 Sheets-Sheet 3
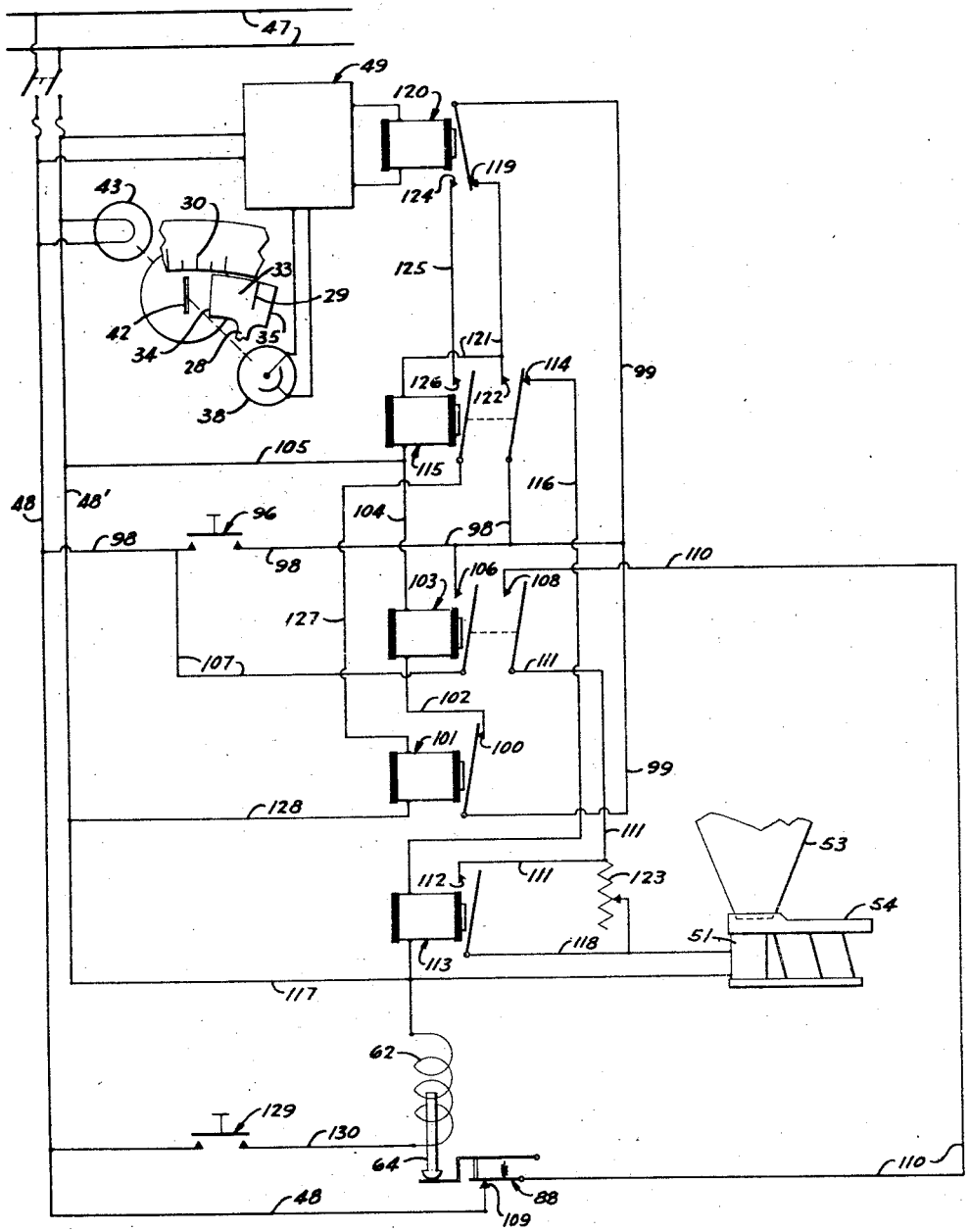
Fig. IV
Mark A. Weckerly
INVENTOR
BY Marshall & Marshall
ATTORNEYS Patented Mar. 3, 1942

2,275,331

UNITED STATES PATENT OFFICE 2,275,331

HOPPER

Mark A. Weckerly, Toledo, Ohio, assignor to Toledo Scale Company, a corporation of New Jersey Application April 25, 1938, Serial No. 204,009

4 Claims. (Cl. 221—118)

This invention relates to hoppers, and more particularly to hoppers adapted to receive material from a material feeding means and adapted to discharge such material when a predetermined amount has accumulated therein.

Hoppers of this kind are frequently mounted upon the load receiving platform of a weighing scale, the scale being equipped with means for determining the amount of material delivered to a hopper by a material feeding device. The scale is further equipped with means for controlling the material feed.

Hoppers of this kind are also provided with gates for discharging the material and these gates are generally locked by means of a latch or catch which must be tripped either manually, or by means of magnets. Latches, catches, or other means for holding the gate, frequently cause trouble due to wear or clogging when dust or some of the material gets into the latching mechanism.

The principal object of this invention is the provision of an electrically controlled hopper having mechanical toggle means for locking its gate without the aid of latches, catches, or similar devices.

Another object is the provision of an improved scale hopper having positive electromagnetically controlled toggle locking means.

A still further object is the provision of an electric circuit and means within the circuit whereby the operation of a material feeding means is controlled and the gate of the hopper opened.

A still further object is the provision of means in the electrical circuit for preventing the operation of the material feeding means unless the gate of the hopper is closed.

These, and other objects and advantages will be apparent from the following description in which reference is had to the accompanying drawings, illustrating a preferred embodiment of the invention and in which similar reference numerals designate similar parts throughout the several views.

In the drawings:

Fig. I is a side view of a hopper embodying the invention and showing its operative relation to material feeding means and to a weighing scale.

Fig. II is an enlarged front elevational view of the hopper gate, showing in detail a toggle, locking and actuating mechanism.

Fig. III is a fragmentary side elevational view thereof; and,

Fig. IV is a diagram of an electrical circuit.

The hopper 55 embodying the present invention is shown mounted upon the load receiving platform of a weighing scale to illustrate the cooperative relation of that device. Since, however, the weighing scale per se forms no part of the invention it is not described in detail. The weighing scale, upon which the hopper embodying the present invention is mounted, includes a customary load platter 18 and a counterpoise platter 19 surmounting a base 11 and an upwardly extending casing 31 housing the load counterbalancing mechanism (not shown). Secured to, and actuated by the load counterbalancing mechanism is an indicator 28 having, at its upper end, an index line 29. This line cooperates with a series of indicia printed, or otherwise marked, on a chart 30 which is stationed within the casing immediately above the indicator 28.

For a purpose which will later become clear, the upper portion of the indicator is also provided with a flag-like opaque screen 33 having radial edges 34 and 35. A window 36, in the casing 31, permits the position of the pointer to be observed at all times.

Secured to the casing 31 is a photoelectrically controlled interrupting means 37. This includes a photoelectric tube 38 enclosed in a light tight housing 39 mounted upon supporting means 40. A portion of the light tight housing 39 that extends into the interior of the casing 31 is provided with a vertically positioned narrow slot 42. This slot is preferably positioned in a plane passing through a selected indicium of the series marked on the chart 30. A bent tube 46, having one of its ends supported by the photoelectrically controlled interrupting means, has secured to its other end a tubular casing 45. Stationed within this tubular casing is a light source 43 and a condensing lens 44. The casing 45 is mounted so that a narrow pencil of light is projected through the slot 42 in the light tight housing 39.

To deliver material to the hopper 55, there is provided a material feeding means including a reciprocating electric motor 51 and a chute 54, actuated by the reciprocating motor, whose discharge end is positioned so that material being fed drops into the hopper 55. A storage hopper 53 is positioned to deposit material in the vibratory chute 54.

The hopper 55, which is mounted, by means of a strap iron frame 55', upon the load receiving platform 18, is preferably constructed from sheet metal. The two side walls $55^2$ are triangular in shape so that the rear wall $55^3$ presents a surface slanting towards the apex of the triangle, the front wall 55⁴ being vertical and having hinged to its lower edge a gate 81.

Improved means are provided for discharging the material which has accumulated in the hopper 55. These means include an armature 64 of a solenoid coil 62 which, by means of a pin 65 and yoke 66, is secured to the upper end of an actuating rod 67, the lower end of which, by means of a clevis 68 and a link 69, pivotally engages a crank-like arm 70 which is pinned to a shaft 71 mounted in bifurcated brackets 72, welded or otherwise fastened to the front wall 55⁴ immediately below a housing member 63, which is also fastened to this wall.

Also pinned to the shaft 71, between the furcations of the bracket 72, are toggle arms 73 which terminate in a threaded portion and which, in cooperation with threaded sleeves 74 and threaded tenons 75 of clevis-like members 76, form adjustable turn-buckles. The clevis-like members 76 pivotally engage other toggle arms in the form of links 77 whose lower ends are pivoted, by means of pins 78, to furcated arms 79 of a plate 80 which is bolted or riveted to the gate 81, the gate being hinged as at 82.

Threaded into and positioned so that their heads form stops for the clevis 76 are short bolts 83. These are adjustable so that the toggles formed by the arms 73, the threaded sleeves 74, the clevises 76 and the links 77, may buckle inwardly about the pins 84 which form the connection between the clevises 76 and the links 77 permitting the pins 84 to pass to the other side of a plane passing through the axes of pins 78 and of the shaft 71 as shown by the dotted line in Fig. III. This forms an effective lock for the hopper gate since any force exerted from the interior of the hopper, such as by material therein, against the lower portion of the gate 81 is resisted by the links 77 which now press upwardly and inwardly against the pins 84 in the clevis 76 which, however, cannot move any further inwardly since they rest against the adjustable stops formed by the heads of the bolts 83. At times it may be desirable to assure this over-center position by securing one of the ends of springs 85 to the pins 84 and their other ends to the plate 80 substantially as shown in Fig. III.

To prevent the operation of the reciprocating motor 51, actuating the vibratory chute 54 while the gate is open, means are provided which are adapted to open an electrical circuit energizing the motor 51. These means comprise a so-called normally open contact "micro" switch 88, secured to an upwardly extending bracket 89 fastened to the bottom wall of the housing member 63 which houses the solenoid 62 and its armature 64. Laterally projecting pins 90 in the upper end of this bracket form a fulcrum for one end of a substantially Z-shaped lever 91, its opposite end being positioned directly beneath the yoke 66 and lightly engaged thereby when the armature 64 of the solenoid 62 is in its lowermost position and the gate 81 is closed and locked by the action of the toggle mechanism. When in this position a screw 92, threaded through the Z-shaped lever 91 and securely locked by nut 93, depresses a projecting dielectric button 94 of the micro switch 88 to prevent the actuation of the reciprocating motor in a manner which will hereinafter be more particularly described.

The amount of material that the hopper is to receive is determined by placing a standard weight of the desired capacity upon the counterpoise platter 19 of the weighing scale.

The operation of the hopper is as follows:

Pressure on a push button 96 (Fig. IV) closes a circuit causing current to flow from one side of the power line 47, through leads 48, 98, and 99, normally closed contact 100 of relay 101, leads 102, the coil of relay 103, leads 104, 105, and 48' to the other side of the power line. Energization of relay 103 closes its normally open contact 106 establishing a hold-in circuit, causing current to flow through leads 48, 98, and 107, through the contact 106, leads 98, 99, contact 100, lead 102, the coil of relay 103 and leads 104, 105 and 48' to the other side of the line.

Closing the contact 106 of relay 103 also closes the contact 108 of relay 103, and current now flows through the lead 48, the contact 109 of micro switch 88, lead 110, contact 108, lead 111, normally open contact 112 of relay 113, which was energized when the circuit was closed by the push button 96. Current then passed from one side of the line through lead 98, normally closed contact 114 of relay 115, lead 116, the coil of relay 113 and through leads 117 and 48' to the other side of the line.

When the contact 112 of relay 113 is made, current passes to the reciprocating motor 51 through a lead 118 from one side of the line, and leads 117 and 48' connect the opposite pole of the reciprocating motor 51 with the other side of the line. This actuates the motor 51 and causes the chute 54 to vibrate, in the known manner, conveying material from the storage hopper 53 into the hopper 55. As the material accumulates therein, and its weight is being sensed by the scale, the indicator 28 of the scale moves in response to this weight, until the leading edge 34 of the flag-like opaque screen 33 on the indicator 28 covers the slot 42, thus preventing light, from the lamp 43 to strike the sensitive element of the photoelectric tube 38. This prevents the passage of current through the photoelectric tube and closes a normally closed contact 119 of a sensitive relay 120, the relay 120 having been energized by current flowing through the photoelectric tube, when the lamp 43 is energized, and amplified by the amplifying means 49. When this contact 119 is closed, current flows through leads 48 and 107, contact 106, leads 98 and 99, normally closed contact 119, lead 121, the coil of relay 115 and through leads 105 and 48' to the other side of the line.

The energization of the coil of the relay 115 opens the contact 114 and closes a contact 122, and current then flows through leads 98, 107, contact 106, lead 98, contact 122, lead 121, coil of relay 115, and through leads 105, and 48' to the other side of the line 47. This maintains the circuit energizing relay 115 when the contact 122 is made. When the contact 114 is opened the coil of relay 113 is de-energized opening the contact 112. The current energizing the reciprocating motor now flows from one side of the power line 47 through lead 48, contact 109 of "micro" switch 88, lead 110, contact 108 of relay 103, lead 111, through a variable resistance 123 and lead 118 to the coil of the reciprocating motor and then through lead 117 and 48' to the other side of the power line 47. The variable resistance 123 permits less current to flow to the reciprocating motor 51 reducing the amplitude of the vibrations of the chute 54 and consequently the material is conveyed to the hopper 55 in a "dribble" stream.

When the final increment of material has been deposited in the hopper 55, the trailing edge 35 of the flag-like opaque screen 33 on the indicator 28, uncovers the slot 42 and light from the lamp 43 again illuminates the photoelectric tube 38 permitting current to flow therethrough. This again energizes relay 120 opening the normally closed contact 119 and closing a contact 124. Current now flows from one side of the power line 47 through leads 48, 98, 107, contact 106, leads 98 and 99, contact 124, lead 125, contact 126, lead 127, coil of relay 101 and then through leads 128 and 48' to the other side of the line 47. This energizes relay 101, opening the normally closed contact 100, thus de-energizing the relays 103 and 115 and opening the circuit energizing the reciprocatory motor 51.

To discharge the material in the hopper 55, the operator closes a switch 129, permitting current to flow from the line 47 through leads 48, and 130, the solenoid coil 62 and through leads 117 and 48' to the other side of the power line 47. When the coil 62 is thus energized, the armature 64 is retracted and this movement is transmitted through the actuating rod 67, clevis 68 and link 69 to the crank-like arm 70. The shaft 71, to which it is pinned, therefore rocks in its bearings and the connection formed by the toggle arms 73, which are fastened to the shaft 71, sleeves 74, clevis member 76, rocks outwardly so that the pin 84 causes the links 77 to pass to the other side of the plane which passes through the axis of the shaft 71 and the pin 78, thus unlocking the gate. Further upward movement of the armature 64, aided by the pressure of the material in the hopper, now opens the hopper gate 81 completely and permits the material therein to flow by gravity into a properly stationed receptacle.

When the coil 62 of the solenoid actuating the gate is de-energized, the action of gravity closes the gate 81 and the momentum carries the toggles into the locked position.

The embodiments of the invention herein shown and described are to be regarded as illustrative only, and it is to be understood that the invention is susceptible to variation, modification and change within the spirit and scope of the subjoined claims.

Having described the invention, I claim:

1. In a device of the class described, in combination, a hopper, material feeding means for delivering material to said hopper, said hopper having a plurality of walls, one of said walls being vertical and another of said walls being inclined relative to the vertical wall, a lower portion of the vertical wall being hinged to the upper portion of the vertical wall and forming a gate, electrical means secured to the upper portion of the vertical hopper wall, an "over-center" toggle linkage having one of its ends secured to said electrical means and its other end to said gate, an electric circuit operatively connecting said material feeding means and said electrical means and controlling the operation of said material feeding means and also controlling the operation of said "over-center" toggle to unlock said gate, and means in said circuit comprising a switch controlled by said electrical means secured to said hopper wall for preventing operation of said material feeding means when said hopper gate is unlocked.

2. In a device of the class described, in combination, nongravitational material feeding means, a hopper having a hinged discharge gate and an inclined wall whereby material in said hopper is caused to slide into contact with and exert pressure upon said hinged gate, means including an "over-center" toggle mechanism connected in such manner to said hopper and to said gate that internal pressure on said gate increases the locking resistance of said "over-center" toggle mechanism, electric means controlling the operation of said nongravitational feeding means, and means cooperating with said electric means and actuated by said "over-center" toggle mechanism for preventing operation of said nongravitational material feeding means unless said toggle is in locking condition.

3. In a device of the class described, in combination, nongravitational material feeding means, a hopper having a hinged discharge gate and an inclined wall whereby material in said hopper is caused to slide into contact with and exert pressure upon said hinged gate, means including an "over-center" toggle mechanism connected in such manner to said hopper and to said gate that internal pressure on said gate increases the locking resistance of said "over-center" toggle mechanism, electric means controlling the operation of said nongravitational material feeding means, and means cooperating with said electric means and actuated by said "over-center" toggle mechanism for preventing operation of said nongravitational material feeding means unless said toggle is in locking condition, said means for preventing operation of the nongravitational material feeding means comprising a make and break switch.

4. In a device of the class described, in combination, material feeding means including a vibratory electric motor, a hopper having a hinged discharge gate, an "over-center" toggle for locking said discharge gate, electric means including a movable armature for unlocking said "over-center" toggle and a switch adapted to be actuated by said movable armature for preventing operation of said vibratory electric motor of said material feeding means unless said toggle is in locking condition.

MARK A. WECKERLY.